(12) United States Patent
Haughs

(10) Patent No.: US 12,467,325 B2
(45) Date of Patent: Nov. 11, 2025

(54) AUTOMATED FLUID SYSTEM

(71) Applicant: Clear Solutions (Holdings) Limited, Wem (GB)

(72) Inventor: James Haughs, Shrewsbury (GB)

(73) Assignee: AI Fluids Limited, Wem (GB)

( * ) Notice: Subject to any disclaimer, the term of this patent is extended or adjusted under 35 U.S.C. 154(b) by 935 days.

(21) Appl. No.: 17/636,684

(22) PCT Filed: Aug. 18, 2020

(86) PCT No.: PCT/EP2020/073121
§ 371 (c)(1),
(2) Date: Feb. 18, 2022

(87) PCT Pub. No.: WO2021/032750
PCT Pub. Date: Feb. 25, 2021

(65) Prior Publication Data
US 2022/0275695 A1 Sep. 1, 2022

(30) Foreign Application Priority Data
Aug. 19, 2019 (GB) ...................... 1911856

(51) Int. Cl.
*E21B 21/08* (2006.01)
*E21B 21/06* (2006.01)
*E21B 44/00* (2006.01)

(52) U.S. Cl.
CPC ............ *E21B 21/08* (2013.01); *E21B 21/062* (2013.01); *E21B 44/00* (2013.01); *E21B 2200/20* (2020.05)

(58) Field of Classification Search
CPC ......... E21B 21/08; E21B 21/062; E21B 44/00
(Continued)

(56) References Cited

U.S. PATENT DOCUMENTS 5,140,527 A * 8/1992 Jones ...................... E21B 21/08
175/42
5,360,738 A * 11/1994 Jones .................... E21B 49/005
436/29
(Continued)

FOREIGN PATENT DOCUMENTS

CN 101566061 A 10/2009
CN 102140911 A 8/2011
(Continued)

OTHER PUBLICATIONS

Li et al. (Cellulose Nanocrystals and Polyanionic Cellulose as Additives in Bentonite Water-Based Drilling Fluids: Rheological Modeling and Filtration Mechanisms, ACS Pub., 2015, pp. 133-143) (Year: 2015).*

(Continued)

*Primary Examiner* — Iftekhar A Khan
(74) *Attorney, Agent, or Firm* — Morgan, Lewis & Bockius LLP

(57) ABSTRACT

A method of controlling the composition of a drilling fluid comprises receiving measurements of properties of a drilling fluid; determining a concentration of the components of the drilling fluid by inputting the measured properties to a fluid model that relates the properties of the drilling fluid to the concentrations of each of the components; determining a desired concentration of each of the plurality of components of the drilling fluid, by inputting desired properties of the drilling fluid to the fluid model; and determining a quantity of one or more additives to be added to the drilling fluid to achieve the desired concentration of each of the plurality of components. The invention includes a controller (20) for controlling the method and a system (1) therefor.

19 Claims, 5 Drawing Sheets

(58) Field of Classification Search
USPC .......................................................... 703/10
See application file for complete search history.

(56) References Cited

U.S. PATENT DOCUMENTS

| | | | | |
|---|---|---|---|---|
| 6,216,801 | B1* | 4/2001 | Jonnes | C09K 8/24 175/38 |
| 6,489,270 | B1* | 12/2002 | Vollmer | C09K 8/514 507/213 |
| 6,926,101 | B2* | 8/2005 | deBoer | E21B 33/076 175/70 |
| 9,194,972 | B2* | 11/2015 | Van Der Zwaag | G01V 3/32 |
| 9,567,852 | B2* | 2/2017 | Jamison | E21B 49/08 |
| 9,696,193 | B2* | 7/2017 | Martin | E21B 47/10 |
| 9,874,506 | B2* | 1/2018 | Gao | E21B 49/081 |
| 10,513,648 | B2* | 12/2019 | Amanullah | C09K 8/06 |
| 10,988,996 | B2* | 4/2021 | Ye | G01N 11/00 |
| 2007/0119244 | A1* | 5/2007 | Goodwin | E21B 49/10 73/152.28 |
| 2008/0113879 | A1* | 5/2008 | Way | C09K 8/80 507/117 |
| 2010/0173804 | A1* | 7/2010 | Van de Peer | C09K 8/32 507/119 |
| 2010/0230164 | A1* | 9/2010 | Pomerleau | C09K 8/5045 507/104 |
| 2011/0088895 | A1* | 4/2011 | Pop | E21B 44/00 166/254.2 |
| 2011/0266056 | A1 | 11/2011 | Pop et al. | |
| 2012/0013335 | A1* | 1/2012 | Saasen | G01N 24/08 324/303 |
| 2013/0312956 | A1 | 11/2013 | Weston et al. | |
| 2015/0024976 | A1* | 1/2015 | Albrighton | C09K 8/601 703/2 |
| 2015/0363520 | A1* | 12/2015 | Bailey | E21B 49/08 703/10 |
| 2016/0138351 | A1* | 5/2016 | Dillard | E21B 33/128 175/25 |
| 2016/0146653 | A1* | 5/2016 | Skelding | E21B 21/01 73/861.01 |
| 2017/0204689 | A1* | 7/2017 | Dykstra | G05B 19/18 |
| 2017/0328154 | A1* | 11/2017 | Song | E21B 21/08 |
| 2017/0343969 | A1* | 11/2017 | Dykstra | E21B 44/005 |
| 2018/0003023 | A1* | 1/2018 | Couturier | E21B 21/106 |
| 2018/0100392 | A1* | 4/2018 | Kleinguetl | E21B 49/08 |
| 2019/0100972 | A1* | 4/2019 | Taylor, III | E21B 21/08 |
| 2019/0178770 | A1* | 6/2019 | Marum | E21B 47/06 |
| 2019/0233706 | A1* | 8/2019 | Adewole | C09K 8/08 |
| 2019/0316457 | A1* | 10/2019 | Al-Rubaii | E21B 44/06 |
| 2019/0360286 | A1* | 11/2019 | Ye | G01N 11/00 |
| 2021/0062647 | A1* | 3/2021 | Ye | E21B 47/113 |
| 2021/0404334 | A1* | 12/2021 | Kulkarni | E21B 44/00 |
| 2022/0228048 | A1* | 7/2022 | Naganawa | C09K 8/08 |
| 2022/0243544 | A1* | 8/2022 | Clarke | E21B 44/00 |
| 2023/0175393 | A1* | 6/2023 | Kulkarni | G01N 33/2823 73/152.04 |
| 2023/0392460 | A1* | 12/2023 | Agu | G01N 15/1459 |

FOREIGN PATENT DOCUMENTS

| | | |
|---|---|---|
| CN | 102216563 A | 10/2011 |
| CN | 102272410 A | 12/2011 |
| EP | 0373695 A1 | 12/1989 |
| SU | 1032165 A1 | 7/1983 |
| SU | 1423728 A1 | 9/1988 |
| WO | 2011095600 A2 | 8/2011 |
| WO | 2016200379 A1 | 12/2016 |
| WO | 2017129523 A1 | 8/2017 |

OTHER PUBLICATIONS

Ettehadi et al. (In-Situ Fluid Rheological Behavior Characterization Using Data Analytics Techniques, 2018, SPE, pp. 1-9) (Year: 2018).*
Office Action for related Chinese Patent Application No. 202080066963.5 dated Sep. 19, 2023, 13 pages.
Yao Rugang et al, "Effect of water-based drilling fluid components on filter cake structure", Powder Technology vol. 262, Aug. 2014, pp. 51-61.
International Search Report and Written Opinion mailed Oct. 16, 2020 for International Patent Application No. PCT/EP2020/073121.
Office Action and Search Report issued in corresponding Russian Patent Application No. 2022106808/03(014056), dated Dec. 27, 2023, 15 pages, with English translation.
Search Report issued in corresponding GB Application No. 1911856.1 dated Jan. 24, 2020, 4 pages.

* cited by examiner

AUTOMATED FLUID SYSTEM

CROSS REFERENCE TO RELATED APPLICATIONS

This application is a U.S. National Stage Application that claims the benefit of International PCT Application No. PCT/EP2020/073121 filed Aug. 18, 2020, which claims the benefit of GB 1911856.1 filed Aug. 19, 2019, entitled "Automated Fluid System", each of which is incorporated by reference herein in its entirety.

TECHNICAL FIELD

The present disclosure relates to drilling fluid systems for boreholes. More specifically, the disclosure relates to methods and systems for monitoring and/or controlling the composition of a drilling fluid.

BACKGROUND

Subterranean wells, such as for exploiting hydrocarbon or geothermal resources, are usually created by rotary drilling. In rotary drilling processes, a rotary cutting head or drill bit is rotated and driven through the ground either via mechanical torque or via fluid pressure from a drilling fluid. The drilling fluid also has other functions, such as lubricating the cutting head and keeping it cool, transporting rock debris to the surface, and preventing formation fluids from entering the borehole.

FIG. 1 shows a simplified schematic diagram of a drilling rig 1. The rig 1 comprises a drill string 2 which extends down into the borehole 3 and terminates in a drill bit 8. The gap between the drill string 2 and walls of the borehole 3 is the annulus 3b. Connected to the drill string 2 is a fluid system, which comprises a pump 5 configured to draw drilling fluid from a mud pit 6. The drilling fluid is driven by the pump 5 up the standpipe 7 and subsequently down the drill string 2. The drilling fluid exits the drill string 2 at the drill bit 8 and passes up the borehole 3 through the annulus 3b. The drilling fluid is then driven along a flow line 9 to a shale shaker 4, which separates solid matter from the drilling fluid and returns the fluid to the mud pit 6 for recirculation.

Drilling fluids can be water based, non-water based, or pneumatic, and in each case comprise a variety of additives. The chemical composition of the drilling fluid determines the physical properties of the drilling fluid, which in turn affects the efficiency of the drilling process. The composition of the drilling fluid must therefore be carefully controlled. In commercial drilling operations, it is the responsibility of a drilling fluid engineer to monitor the composition of the drilling fluid, commonly by taking samples of the fluid at regular intervals (e.g., once every six hours). The drilling fluid engineer then determines which (if any) additives are required, and what quantity of additives is needed. The drilling fluid engineer mixes the additives with the drilling fluid to provide the desired fluid properties. The addition of additives to the drilling fluid may be referred to as dosing.

The correct chemical dosing regimen to maintain or modify the composition of the drilling fluid is highly subjective and partly dependent on the experience and competency of the personnel charged with its management. As such, the interpretation is prone to numerous cognitive biases and is reliant on the level of experience and training of the drilling fluid engineer.

The present invention seeks to resolve or ameliorate the above problems, or provide a useful alternative thereto.

SUMMARY

According to a first aspect, there is provided a method of controlling composition of a drilling fluid. The method may comprise receiving measurements of properties of a drilling fluid. The method may further comprise determining a concentration of each of a plurality of components of the drilling fluid. The concentration may be determined by inputting the measured properties to a fluid model that relates the properties of the drilling fluid to the concentrations of each of the components. The method may further comprise determining a desired concentration of each of the plurality of components of the drilling fluid. The desired concentration may be determined by inputting desired properties of the drilling fluid to the fluid model. The method may further comprise determining a quantity of one or more additives to be added to the drilling fluid to achieve the desired concentration of each of the plurality of components.

Optionally, determining the desired concentration of each of the plurality of components of the drilling fluid comprises randomly selecting a concentration of each of the plurality of components of the drilling fluid, and using the fluid model to estimate properties of a drilling fluid having the randomly selected concentrations. The method may further comprise comparing the desired properties of the drilling fluid with the estimated properties of a drilling fluid having the randomly selected concentrations.

The method may further comprise determining a composition of the drilling fluid having properties that most closely match the desired properties by repeatedly performing the operations of randomly selecting a concentration of each of the plurality of components of the drilling fluid, using the fluid model to estimate properties of a drilling fluid having the randomly selected concentrations, and comparing the desired properties of the drilling fluid with the estimated properties of a drilling fluid having the randomly selected concentrations.

Optionally, determining a concentration of each of the plurality of components of the drilling fluid may comprise estimating a concentration of a component of the drilling fluid using a mass balance equation. The method may further comprise solving the mass balance equation using an estimated quantity of a component of the drilling fluid that has been depleted during a drilling process. The method may further comprise estimating the quantity of a component of the drilling fluid that has been depleted using a depletion model that relates depletion of the component to one or more variables of the drilling process. The method may further comprise updating a depletion coefficient of the depletion model based on measurements of the one or more variables made during the drilling process. The method may further comprise solving the mass balance equation using a known quantity of an additive that has been added to the drilling fluid during a drilling process. Determining a concentration of each of the plurality of components of the drilling fluid may further comprise determining a plurality of candidate concentrations of each of the plurality of components of the drilling fluid by inputting the measured properties to the fluid model and eliminating a candidate concentration that is inconsistent with the estimated concentration.

The one or more additives comprise any one or more of: a viscosifier; a filtration control polymer; an encapsulating polymer; an inhibitor; an extended inhibitor; a lubricant; a formation stabiliser; a bridging solid; a pore plugging additives; a temperature stabilisers;

a hardness contamination treatment; a pH control additive; and/or a biocidal additive.

The one or more additives may comprise a polysaccharide. The one or more additives may comprise any one or more of guar gum, xanthan gum, starch, pre-gelatinised starch, cellulose, carboxymethyl cellulose including polyanionic carboxymethyl cellulose, hydroxyethyl cellulose, and Locust Bean.

The method may further comprise measuring the properties of the drilling fluid using one or more sensors on a drilling rig. The sensors may include sensors configured to measure any one or more of the following properties: rheology (e.g., shear rate, shear stress and/or viscosity); fluid density; temperature; chloride concentration; cation concentration; cation species; pH; fluid filtration; oil, water and/or solid concentration; particle size distribution; alkalinity (e.g., carbonate vs bicarbonate concentration); amine concentration. It will be appreciated that these are examples of the sensors that might be used, and that other types of sensor could also be used.

The properties may include one or more of: viscosity; density; a rheological property; filtrate data; a measured concentration of one or more ions; a measured concentration of one or more chemicals; and filtration/fluid loss. Additionally or alternatively, the properties may include funnel viscosity, plastic viscosity, thixotropic index, yield point, gel strength, electrical stability, and encapsulation rates.

The method may further comprise controlling a chemical dosing apparatus to add the determined quantity of the one or more additives to the drilling fluid.

According to a further aspect, there is provided a controller for controlling composition of a drilling fluid. The controller may comprise one or more processors. The controller may comprise a processor-readable medium storing instructions that, when executed by the one or more processors, cause the controller to perform a method as described herein.

According to a further aspect, there is provided a drilling rig comprising a controller as described herein. Optionally, the drilling rig may further comprise one or more sensors configured to measure properties of a drilling fluid. The sensors may be configured to provide the measured properties to the controller. The drilling rig may comprise a chemical dosing apparatus for adding the determined quantity of the one or more additives to the drilling fluid.

According to a further aspect, there is provided a processor-readable medium comprising instructions that, when executed by one or more processors, cause the one or more processors to perform a method as described herein. According to yet another aspect, there is provided a computer program comprising instructions that, when executed by a computer, cause the computer to perform a method as described herein.

BRIEF DESCRIPTION OF DRAWINGS

Embodiments will now be described, purely by way of example, with reference to the accompanying drawings, wherein like elements are indicated using like reference signs, and in which.

DETAILED DESCRIPTION

Figure 1:
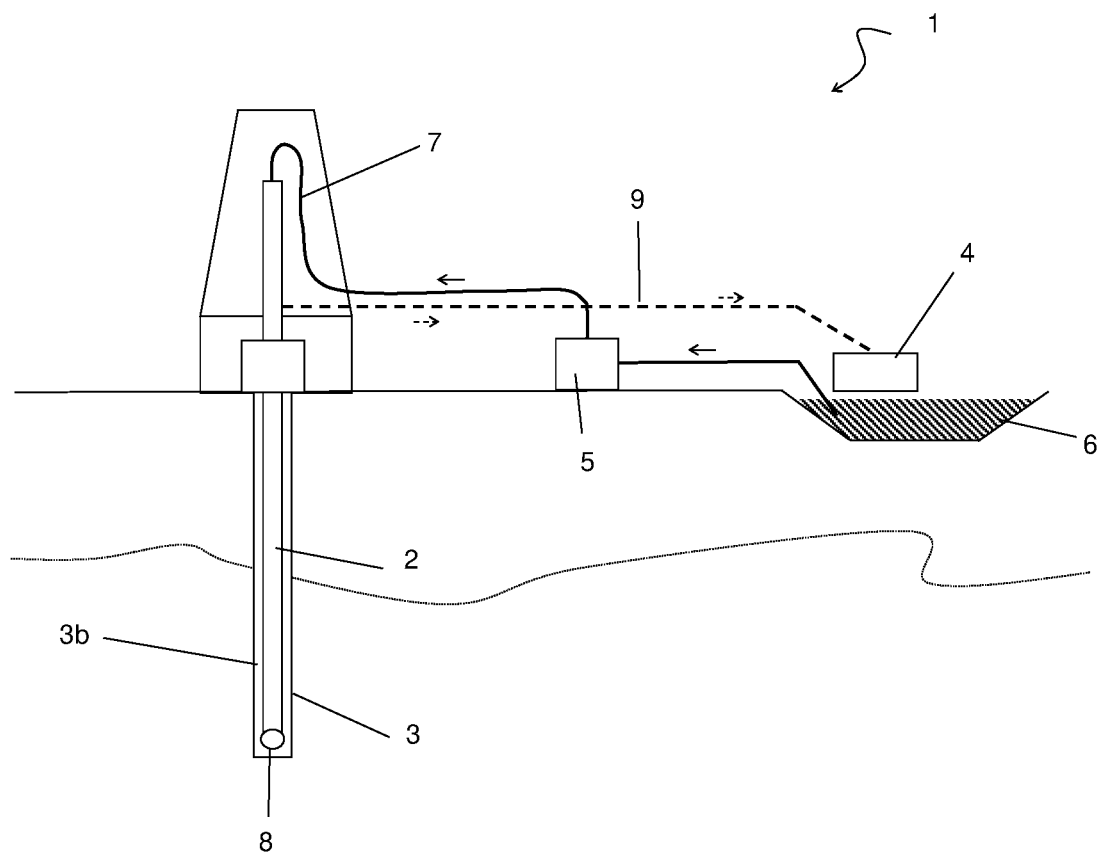
FIG. 1 is a simplified schematic diagram of a conventional drilling rig.
Figure 2:
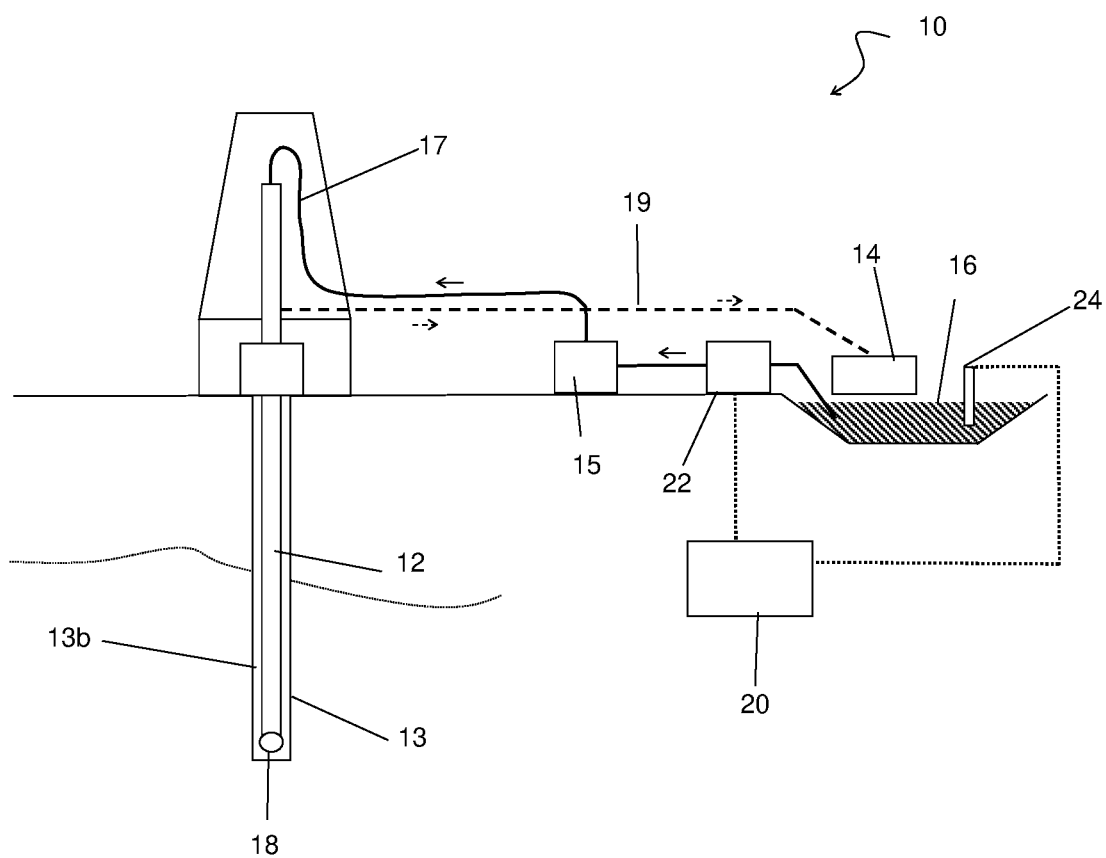
FIG. 2 is a simplified schematic diagram of a drilling rig in accordance with the present disclosure.

Turning now to FIG. 2, there is shown a drilling rig 10 in accordance with the present disclosure. The drilling rig 10 is similar to the drilling rig 1, where equivalent features 2 to 9 are labelled 12 to 19 accordingly.

The drilling rig 10 is further provided with a sensor array 24 and a chemical dosing apparatus 22. The sensor array 24 and dosing apparatus 22 are both controlled by a controller 20.

The sensor array 24 comprises one or more sensors for monitoring properties (such as physical or chemical characteristics) of the drilling fluid. In some embodiments, the sensor array 24 comprises at least one sensor configured to detect physical characteristics of the drilling fluid directly in the mud pit 16. Alternatively or in addition, the sensor array 24 may be configured to extract samples from the mud pit 16 for a sensor to monitor or perform tests thereon. In other examples (not shown in FIG. 2) of the present disclosure, the sensor array 24 can include one or more sensors located at a different position within the system. For example, a sensor of the sensor array 24 may be within the flow line 19, integrated within the dosing apparatus 22, in one of the feed conduits feeding the dosing apparatus 22 or pump 15, in a standpipe 17 and/or within the borehole 13. A combination of different sensors may be used.

The dosing apparatus 22 is configured to add one or more additives to the drilling fluid. In FIG. 2, the dosing apparatus 22 is shown in-line and is configured to dose the drilling fluid passing through the conduit to the pump 15. Alternatively, the dosing apparatus 22 can be positioned elsewhere within the system. For example, the dosing apparatus 22 may be configured to dose and disperse additives directly into the drilling fluid within the mud pit 16, or into the borehole 13.

The controller 20 may comprise one or processors operatively coupled to a memory (not shown in FIG. 2). The memory may comprise instructions that, when executed by the one or more processors, cause the processor to perform any of the methods disclosed herein. The controller 20 is configured to receive sensor data from the sensor array 24, and to control the dosing apparatus 22 in response to the sensor data. For example, the controller 20 may have one or more interfaces through which sensor data can be received from the sensor array 24, and through instructions and/or data can be sent to control the dosing apparatus 22.

The method of operation of the controller 20 is described with reference to FIGS. 3 to 5 below.

Figure 3:
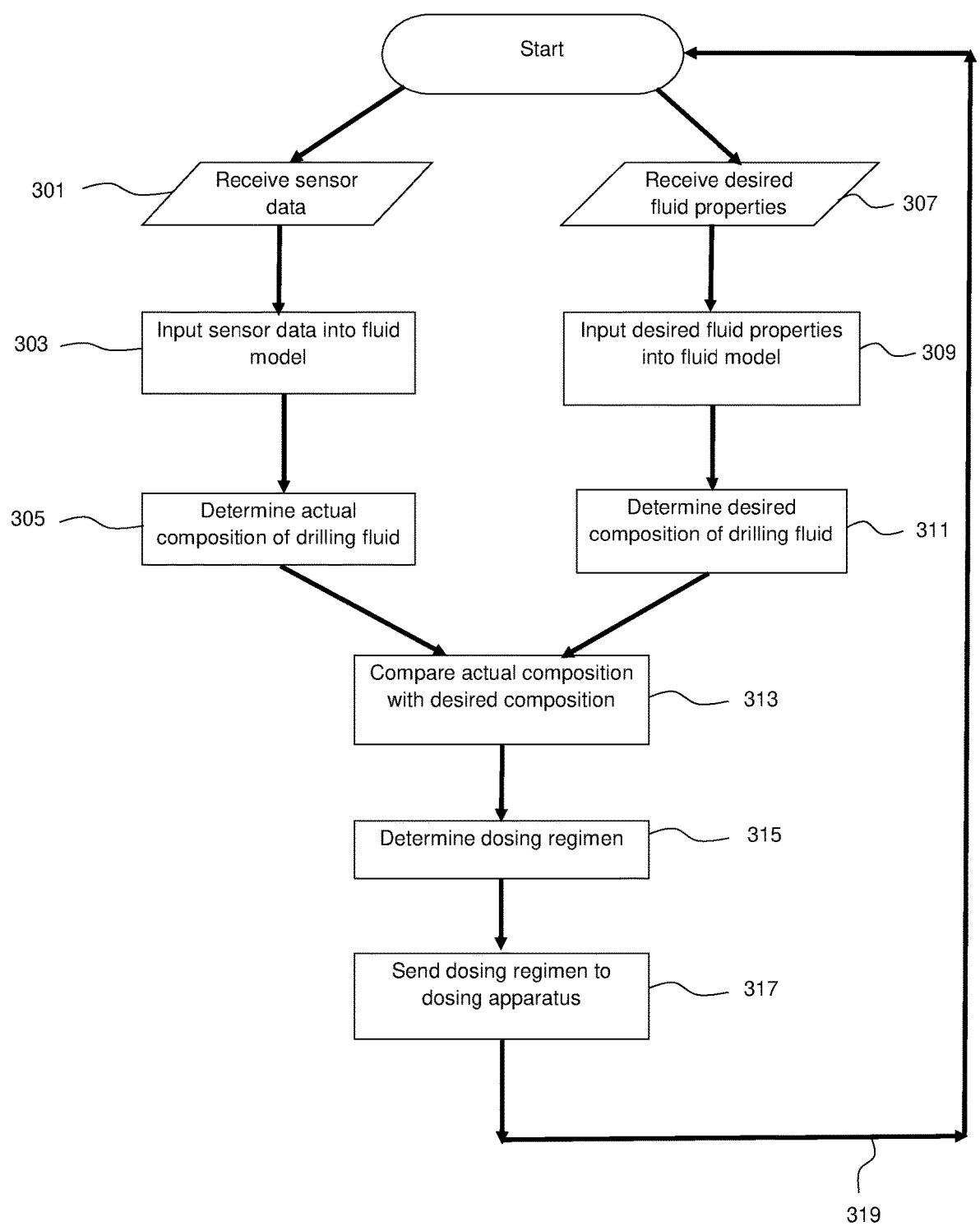
FIG. 3 is a flow diagram of a method for controlling the composition of a drilling fluid.

FIG. 3 is a schematic diagram showing a method performed by the drilling rig 10, and more specifically by the controller 20 of the drilling rig. The controller 20 is configured to receive measurements of properties of the drilling fluid and respond by adjusting the fluid composition in real time.

Sensor data is received at block 301. For example, the sensor data is received from the sensor array 24. The sensor data may be any property of the drilling fluid measured by the sensor array, such as physical or chemical properties. The sensor data may include any one or more of: viscosity; density; rheological properties; filtrate data; a measured concentration of one or more ions; a measured concentration of one or more chemicals; filtration/fluid loss; funnel viscosity; plastic viscosity; thixotropic index; yield point; gel strength; electrical stability; encapsulation rates; or any other measurable physical or chemical property.

The sensor data is input into a fluid model at block 303. The fluid model relates properties of the drilling fluid to the concentrations of each of a plurality of components of the drilling fluid. The fluid model may include a plurality of equations, where each equation relates a property of the drilling fluid to the concentrations of one or more components of the drilling fluid and, optionally, to one or more other properties of the drilling fluid. Purely for the purposes of illustration, an equation of the fluid model may have the following form:

$$\text{property}_x = A*\text{concentration}_1 + B*\text{concentration}_2 + C*\text{property}_y + D*\log(\text{property}_z) + E*(\text{concentration}_2)^2 + F$$

where: $\text{property}_x$, $\text{property}_y$, $\text{property}_z$, are the values of three physical or chemical properties of the drilling fluid; A, B, C, D and E are coefficients; and concentration, and $\text{concentration}_2$ are concentrations of two components of the drilling fluid. It will be appreciated that the equation above is intended solely to assist the reader in understanding the nature of the fluid model. In reality, the fluid model comprises multiple equations, any of which can have a different form from that shown above.

The fluid model is calculated from laboratory data relating to various drilling fluid compositions and their measured physical and chemical properties. The fluid model can be calculated by a regression analysis, so as to determine the relationship of a given property of the drilling fluid to other properties of the drilling fluid and the concentrations of the components of the drilling fluid. In some embodiments, the fluid model may be updated based on live feedback from the system to improve its accuracy.

The actual composition of the drilling fluid is then determined at block 305. This typically comprises the controller 20 solving the equations of the fluid model, when the sensor data received at block 301 has been input into the equations at block 303. The result of this calculation allows the controller 20 to determine the composition of the drilling fluid. The composition of the drilling fluid may be expressed as a concentration of each of a plurality of components of the drilling fluid. An example implementation of block 305 is discussed in more detail below, in connection with FIG. 4.

At block 307, desired properties of the drilling fluid are received. For example, a user (such as a drilling fluid engineer) inputs the desired properties of the drilling fluid. The user may input the desired properties via the controller 20. This may be achieved through a computer and user interface, or any other suitable apparatus. Examples of desired fluid properties may include viscosity, thixotropic index, density or any other property such as physical or chemical properties listed herein.

The desired fluid properties are then input into the fluid model at block 309.

A desired composition of drilling fluid is then determined at block 311. This typically comprises the controller 20 solving the equations of the fluid model, when the desired fluid properties received at block 307 have been input into the equations at block 309.

The result of this calculation allows the controller 20 to determine a drilling fluid composition which would meet the inputted desired fluid properties. The desired composition of the drilling fluid may be expressed as a concentration of each of a plurality of components of the drilling fluid. The controller 20 may determine multiple different drilling fluid compositions which would achieve the same or similar fluid properties. The controller 20 may automatically determine that one of the possible drilling fluid compositions is optimal, and may automatically select that as the desired drilling fluid composition. Alternatively, the controller 20 may allow a user to select a composition from among several possible drilling fluid compositions. The controller 20 may be configured to identify and inform the user regarding strengths and weaknesses of particular compositions. For example, the controller may identify and/or compare the cheapest composition with the desired properties to the composition which most closely matches the desired properties, or the composition which requires the fewest chemical additions, or any other criteria selectable by a user.

The controller 20 compares the actual composition of the drilling fluid with the desired composition of the drilling fluid at block 313. The controller is thus able to identify whether the actual composition is the same as, or different from, the desired composition.

Based on this comparison, a dosing regimen is determined at block 315. The dosing regimen includes a quantity of one or more additives that can be added to the drilling fluid, in order to change the actual composition of the drilling fluid to match the desired composition of the drilling fluid. If the actual and desired compositions are compared at block 313 and found to be the same, then the dosing regimen may indicate that no additives need to be added to the drilling fluid. If the actual composition is found to have a fluid property too high or too low compared to the desired composition, the controller 20 can adjust the dosing regimen accordingly.

The dosing regimen is sent to the dosing apparatus 22 at block 317. The regimen may be sent by any suitable method, and may be via wired or wireless connection. Upon receiving the dosing regimen, the dosing apparatus 22 adds one or more additives to the drilling fluid to change the drilling fluid composition to match the desired concentration of the drilling fluid. If the actual and desired two compositions were determined to match at block 313, the dosing regimen will be unchanged and block 317 need not be performed.

The process then repeats 319. If necessary, a delay can be implemented before the process repeats.

The user input path, as shown by blocks 307, 309, and 311, are displayed as occurring in parallel (and optionally simultaneously) to the sensor data path as shown by blocks 301, 303 and 305. The system may be operated to carry out the user input path before or after the sensor data path. The process may be operated so that the user input path and the sensor data path are repeated with the same or with different periodicities. For example, the process may be repeated so that the sensor data path is repeated with a first frequency, which may be time based, such as every 5 or 10 minutes. The process may be repeated so that the user input path is repeated with a second frequency, or in response to other variables or a combination thereof. The second frequency may be hourly, or daily. The other variable may include borehole depth or in response to the rock being drilled for example.

As noted above, the fluid model is calculated empirically from laboratory data by testing the fluid properties of a large range of drilling fluid compositions. In conventional drilling processes, the high number of additives makes performing such testing prohibitive. However, the present inventors have found that using drilling fluid additives such as Pure-Bore® and Pure-Bore LV® can be used in place of multiple conventional drilling fluid additives to perform multiple functions (e.g. to adjust the viscosity, shear thinning, drag reduction, shale encapsulation etc.). Thus the overall composition of the drilling fluid is simplified, and the equations of the fluid model can be more easily solved. It will be appreciated that the invention is not intended to be limited to drilling fluid systems comprising Pure-Bore® and Pure-Bore LV®, but this is an example of the efficacy of the system. As an alternative to using Pure-Bore® or Pure-Bore LV®, conventional drilling fluid additives can be blended in predetermined ratios to perform multiple functions and thereby reduce the amount of testing required.

Figure 4:
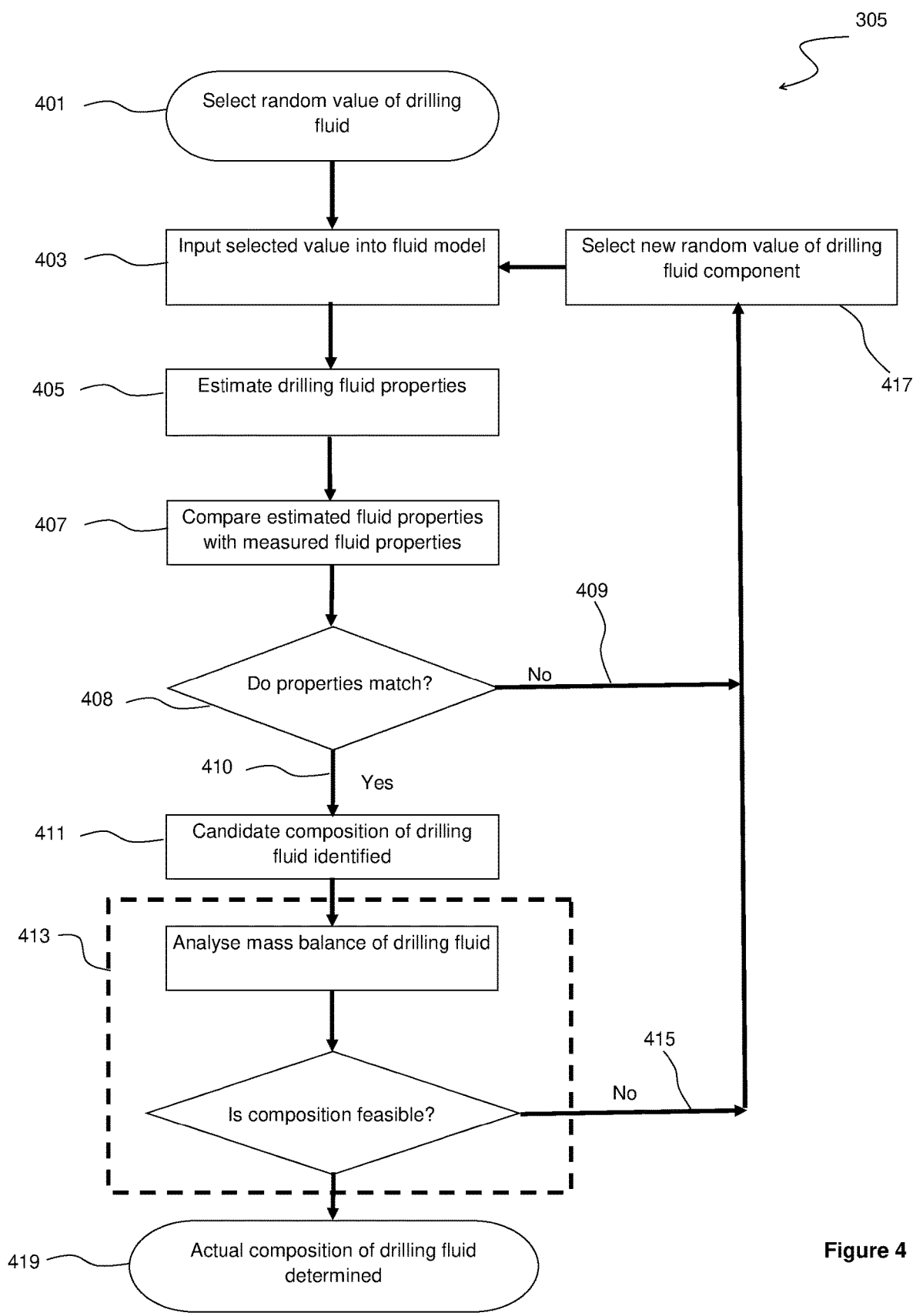
FIG. 4 is a flow diagram of a method for determining the composition of a drilling fluid.

Turning now to FIG. 4, an example implementation of a process 305 of determining the actual composition of the drilling fluid will be explained in further detail. FIG. 4 sets out a process by which a Monte Carlo analysis may be used to determine the drilling fluid composition.

Firstly, a random value (such as total content or concentration etc.) of a drilling fluid component is selected at block 401. The component may be any potential component or combinations of components. For example, the concentration of each of a plurality of components of the drilling fluid may be selected randomly.

The random value is input into the fluid model at block 403. The fluid model is the same fluid model used in the process as described above with reference to FIG. 3.

Subsequently, the properties of the drilling fluid are estimated at block 405, based on the randomly selected value. This typically comprises the controller 20 solving the equations of the fluid model, when the random value selected at block 401 has been input into the equations at block 403. The result of this calculation allows the controller 20 to estimate the properties of a drilling fluid whose components have the concentrations that were randomly selected at block 401.

The estimated fluid properties are compared with the measured fluid properties at block 407. More specifically, the fluid properties that were estimated at block 405 are compared with fluid properties that were derived or measured directly from the sensor array 24 at block 301. The controller 20 then determines whether the estimated and measured fluid properties match at block 408.

If the properties of the fluid do not match 409, a new random value of a drilling fluid component is selected at block 417. Block 417 is essentially the same as block 401. The new random value may not be truly random, since it may exclude previously selected values to avoid duplication. The new value is inputted into the fluid model at block 403, and the process is repeated. It is expected that this process will repeat many times before the estimated fluid properties match the measured fluid properties.

If the estimated properties of the drilling fluid do match 410 those observed and measured from the drilling fluid, a candidate composition has been identified 411. Since the fluid properties are a result of a number of inter-related factors and components, multiple random compositions could provide a drilling fluid with estimated fluid properties which would match the measured properties of the drilling fluid. Thus, a second check is performed to filter out low probability candidate drilling fluid compositions.

In order to determine whether a candidate composition is feasible, the mass balance of the drilling fluid system is analysed at block 413, which is further described with reference to FIG. 5.

The controller 20 has a record of the initial fluid composition and all fluid additive additions and thus will be able to reject candidate compositions which are not feasible 415 (i.e. not possible or highly unlikely).

When a candidate composition is rejected, a new random value or concentration of drilling fluid component is selected at block 417 and the process repeats.

If the mass balance analysis indicates that the candidate composition is feasible (i.e. possible and highly likely), then the candidate composition is deemed to be the actual composition of the drilling fluid at block 419.

Overall, the process is repeated multiple times until the series of random concentration values selected satisfies both the comparison against the observed physical characteristics 407 of the drilling fluid and the mass balance analysis 413. This actual composition is then compared against the desired composition as described previously.

Figure 5:
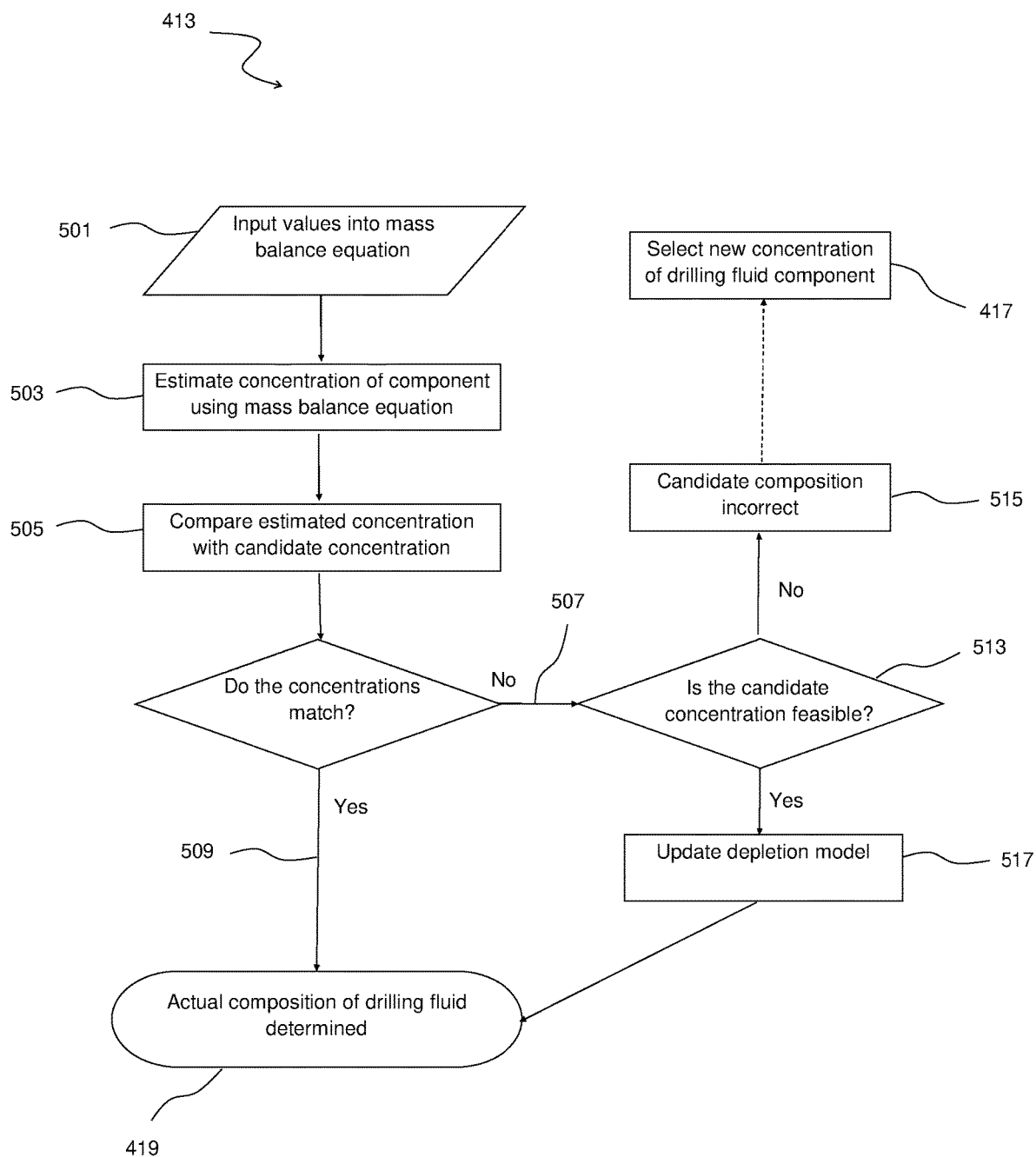
FIG. 5 is a flow diagram of a method for determining the composition of a drilling fluid.

Turning now to FIG. 5, there is shown in greater detail how the mass balance analysis 413 is carried out.

The mass balance analysis 413 uses a fluid depletion model, which has been derived from known rates of fluid component loss when drilling through particular formations of rock. Since the drilling process is carried out at overpressure, there is an expected rate of water loss into the surrounding formation. Rock formations also preferentially absorb specific components or additives from the drilling fluid, causing a gradual depletion of certain components. A depletion model can thus be calculated from the known depletion rates of each component and the observed rock formations being drilled. As with the fluid model described above, the depletion model is an empirical model that is derived from experimental data. The depletion model may be a multivariate linear equation. The depletion model may consist of a set of coefficients that are used in combination with one or more variables of the drilling process to predict the rate of depletion of one or more components of the drilling fluid. The depletion model thus relates depletion of a component of the drilling fluid to one or more variables of the drilling process. The depletion model can be used to estimate the quantity of a component of the drilling fluid that has been depleted.

Values are input to a mass balance equation at block 501. The mass balance equation has the following form:

$$mass_{current} = mass_{initial} + mass_{added} - mass_{depleted}$$

The mass balance equation relates the current mass of a particular component in the drilling fluid ($mass_{current}$) to the initial mass of that component in the drilling fluid ($mass_{initial}$), the mass of that component that has been added to the drilling fluid ($mass_{added}$), and the estimated mass of that component that has been depleted during drilling ($mass_{depleted}$). Thus, the values that are input to the mass balance equation at block 501 may include a known initial composition of the drilling fluid, historic data on the mass of one or more additives that were added to the drilling fluid after the initial composition of the drilling fluid was determined (e.g., as a result of the operation performed at block 317), and an estimated depletion of one or more components. The estimated depletion can be calculated using the depletion model and measurements of the variables of the drilling process. It will be appreciated that there may be a mass balance equation for each component of the drilling fluid, and that block 501 may include inputting values into each of the mass balance equations.

The mass balance equation is used to estimate the concentration of a component of the drilling fluid at block 503. More specifically, the mass balance equation is solved, so as to estimate the current mass of a component in the drilling fluid ($mass_{current}$). The concentration of the component can then be estimated from its estimated current mass. The concentration of multiple components of the drilling fluid may be estimated in a similar manner, by solving the respective mass balance equation for each component.

Each estimated concentration is then compared against a respective candidate concentration at block 505. A candidate concentration is the concentration of a particular component of a candidate composition of the drilling fluid, which is determined in blocks 401 to 411 of the process described with reference to FIG. 4. The controller 20 thus assesses whether the estimated concentration matches the candidate concentration.

If the estimated concentration matches the candidate concentration for all components of the drilling fluid 509, then the candidate composition is confirmed as the actual composition of the drilling fluid at block 419.

Alternatively, if any of the estimated concentrations do not match 507 the respective candidate concentration, a further analysis is performed in which the controller 20 assesses whether the candidate composition is feasible at block 513.

If the difference between the candidate composition and the estimated composition is greater than an acceptable margin of error, then it is concluded that the candidate concentration is incorrect at block 515. The margin of error may be set by the system or it may be selectable by a user, for example, to allow fine tuning of the system by the user.

The process then repeats by selecting a new random concentration of a drilling fluid component 417 as described previously and with reference to FIG. 4.

However, if the difference between the estimated and candidate compositions is within an acceptable margin of error, then the actual composition of the drilling fluid is deemed to have been determined correctly. The difference between the estimated and candidate compositions is determined to be due to the depletion model being incorrect or out of sync with the progress of the drilling operation. Thus, the depletion model is updated accordingly at block 517. As the drilling process continues, the drill string and borehole will pass through new rock formations and the depletion rates will vary accordingly as different rocks are being drilled. Thus, as the drilling continues the depletion model is refined and updated continuously, and the overall accuracy of the mass balance analysis improves. The mass balance analysis 413 thus automatically reconfigures itself to changing conditions within the borehole.

As described previously, the necessary processes are carried out by the controller 20 to derive a dosing regimen for the dosing apparatus 22 to carry out. Depending on the desired periodicity, the process can be carried out continuously to provide live, real-time monitoring of the drilling fluid composition and borehole conditions. The system can thus react far faster than existing systems relying on human analysis and intervention. By reacting faster, the drilling fluid can be maintained within optimal operating conditions for a higher proportion of time. The efficiency of the drilling operation is thus greatly improved. Furthermore, by avoiding over-dosing of certain additives, the operating costs are reduced.

The methods disclosed herein can be performed by instructions stored on a processor-readable medium. The processor-readable medium may be: a read-only memory (including a PROM, EPROM or EEPROM); random access memory; a flash memory; an electrical, electromagnetic or optical signal; a magnetic, optical or magneto-optical storage medium; one or more registers of a processor; or any other type of processor-readable medium. In alternative embodiments, the present disclosure can be implemented as control logic in hardware, firmware, software or any combination thereof. The apparatus may be implemented by dedicated hardware, such as one or more application-specific integrated circuits (ASICs) or appropriately connected discrete logic gates. A suitable hardware description language can be used to implement the method described herein with dedicated hardware.

It will be understood that the invention has been described above purely by way of example, and that modifications of detail can be made within the scope of the invention.

The invention claimed is:

1. A method of controlling composition of a drilling fluid, comprising:
   receiving, by one or more processors, measurements of properties of a drilling fluid from one or more sensors measuring the properties of the drilling fluid;
   determining, using the one or more processors executing instructions embodying a fluid model, a current concentration of each of a plurality of components of the drilling fluid by:
      inputting the measured properties into the fluid model to identify a candidate concentration of each of the plurality of components, wherein the fluid model relates the properties of the drilling fluid to concentrations of each of the components,
      estimating a concentration of each of the plurality of components using a mass balance equation, and
      comparing the estimated concentrations with the candidate concentrations to determine the current concentration of each of the plurality of components;
   determining, using the one or more processors executing instructions embodying the fluid model, a desired concentration of each of the plurality of components by inputting desired properties of the drilling fluid into the fluid model;
   determining, using the one or more processors, a quantity of one or more additives to be added to the drilling fluid to achieve the desired concentration of each of the plurality of components; and
   adding, using a chemical dosing apparatus controlled by the one or more processors, the determined quantity of the one or more additives to the drilling fluid to achieve the desired properties of the drilling fluid.

2. A method in accordance with claim 1, wherein determining the desired concentration of each of the plurality of components of the drilling fluid further comprises:
   randomly selecting, using the processor executing instructions embodying the fluid model, a concentration of each of the plurality of components of the drilling fluid; and
   using the fluid model to estimate properties of a drilling fluid having the randomly selected concentrations.

3. A method in accordance with claim 2, further comprising:
   comparing, using the processor executing instructions embodying the fluid model, the desired properties of the drilling fluid with the estimated properties of a drilling fluid having the randomly selected concentrations.

4. A method in accordance with claim 3, further comprising:
   determining, using the processor executing instructions embodying the fluid model, a composition of the drilling fluid having properties that most closely match the desired properties by repeatedly performing the operations of randomly selecting a concentration of each of the plurality of components of the drilling fluid, using the fluid model to estimate properties of a drilling fluid having the randomly selected concentrations, and comparing, using the processor executing instructions embodying the fluid model, the desired properties of the drilling fluid with the estimated properties of a drilling fluid having the randomly selected concentrations.

5. A method in accordance with claim 1, wherein determining a concentration of each of the plurality of components of the drilling fluid further comprises:

solving, using the processor executing instructions embodying the fluid model, the mass balance equation using an estimated quantity of a component of the drilling fluid that has been depleted during a drilling process.

6. A method in accordance with claim 5, further comprising:

estimating, using the processor executing instructions embodying the fluid model, the quantity of a component of the drilling fluid that has been depleted using a depletion model that relates depletion of the component to one or more variables of the drilling process.

7. A method in accordance with claim 6, further comprising:

updating, using the processor executing instructions embodying the fluid model, a depletion coefficient of the depletion model based on measurements of the one or more variables made during the drilling process.

8. A method in accordance with claim 1, wherein determining a concentration of each of the plurality of components of the drilling fluid further comprises:

solving, using the processor executing instructions embodying the fluid model, the mass balance equation using a known quantity of an additive that has been added to the drilling fluid during a drilling process.

9. A method in accordance with claim 1, wherein determining a concentration of each of the plurality of components of the drilling fluid further comprises:

determining, using the processor executing instructions embodying the fluid model, a plurality of candidate concentrations of each of the plurality of components of the drilling fluid by inputting the measured properties to the fluid model; and eliminating, using the processor executing instructions embodying the fluid model, a candidate concentration that is inconsistent with the estimated concentration.

10. A method in accordance with claim 1, wherein the one or more additives include a polysaccharide.

11. A method in accordance with claim 1, further comprising:

measuring the properties of the drilling fluid using the one or more sensors on a drilling rig.

12. A method in accordance with claim 11, wherein the properties include one or more of: viscosity; density; a rheological property; filtrate data; a measured concentration of one or more ions; a measured concentration of one or more chemicals; and filtration/fluid loss.

13. A method in accordance with claim 1, further comprising:

controlling, using the processor, the chemical dosing apparatus to add the determined quantity of the one or more additives to the drilling fluid.

14. A controller for controlling composition of a drilling fluid, the controller comprising:

one or more processors; and a processor-readable medium storing instructions that, when executed by the one or more processors, cause the controller to perform a method in accordance with claim 1.

15. A drilling rig comprising a controller in accordance with claim 14.

16. A drilling rig in accordance with claim 15, further comprising:

one or more sensors configured to measure properties of a drilling fluid, and to provide the measured properties to the controller; and/or a chemical dosing apparatus for adding the determined quantity of the one or more additives to the drilling fluid.

17. A non-transitory processor-readable medium comprising instructions that, when executed by one or more processors, cause the one or more processors to perform a method in accordance with claim 1.

18. A computer program product comprising instructions that, when executed by a computer, cause the computer to perform a method in accordance with claim 1.

19. A method in accordance with claim 1, wherein the fluid model utilizes one or more of regression analysis, Monte Carlo analysis, mass balance analysis, or a plurality of equations to relate the properties of the drilling fluid to the concentration of each of the plurality of components of the drilling fluid.

* * * * *